United States Patent [19]

Miyoshi et al.

[11] Patent Number: 5,310,218
[45] Date of Patent: May 10, 1994

[54] STEERING WHEEL STRUCTURE FOR VEHICLE

[75] Inventors: Keisuke Miyoshi, Hiroshima; Akira Marumoto, Kure; Michitaka Ohta, Hiroshima, all of Japan

[73] Assignee: Mazda Motor Corporation, Hiroshima, Japan

[21] Appl. No.: 796,335

[22] Filed: Nov. 22, 1991

[30] Foreign Application Priority Data

| Nov. 27, 1990 | [JP] | Japan | 2-326704 |
| Nov. 27, 1990 | [JP] | Japan | 2-327775 |
| Nov. 30, 1990 | [JP] | Japan | 2-337576 |
| Mar. 6, 1991 | [JP] | Japan | 3-040074 |
| Sep. 10, 1991 | [JP] | Japan | 3-230091 |

[51] Int. Cl.$^5$ .................................. B60R 21/00
[52] U.S. Cl. ............................. 280/777; 74/552; 280/731
[58] Field of Search ............ 280/731, 750, 777; 74/552, 492

[56] References Cited

U.S. PATENT DOCUMENTS

| 3,773,352 | 11/1973 | Radke | 280/731 |
| 3,888,508 | 6/1975 | Kizu et al. | 280/731 |
| 4,884,823 | 12/1989 | Honda | 280/731 |
| 4,945,786 | 8/1990 | Goto | 280/750 |
| 4,976,801 | 12/1990 | Martine et al. | 156/245 |

FOREIGN PATENT DOCUMENTS

| 0329542 | 8/1989 | European Pat. Off. |
| 1817336 | 10/1969 | Fed. Rep. of Germany . |
| 1945480 | 4/1971 | Fed. Rep. of Germany ...... 280/750 |
| 2353425 | 12/1977 | France . |
| 63-8069 | 1/1988 | Japan .................................. 74/552 |
| 3-169764 | 7/1991 | Japan .................................. 280/731 |
| 1251189 | 10/1971 | United Kingdom . |
| 9009297 | 8/1990 | World Int. Prop. O. . |

Primary Examiner—Karin L. Tyson
Attorney, Agent, or Firm—Keck, Mahin & Cate

[57] ABSTRACT

A steering wheel structure includes a steering wheel ring, a first spoke extending downward from a steering shaft and carrying the steering wheel ring on the steering shaft and, an air bag case disposed on a tip end portion of the steering shaft. An air bag received in the air bag is case in a folded state and an inflator is provided for inflating the air bag with gas. An igniter is used to ignite a material in the inflator to produce the gas. A displacing device is provided for allowing the spoke and lower portion of the steering wheel ring to be displaced when subjected to a forward force beyond a predetermined value. An impact energy therefore, can be effectively and safely absorbed.

20 Claims, 13 Drawing Sheets

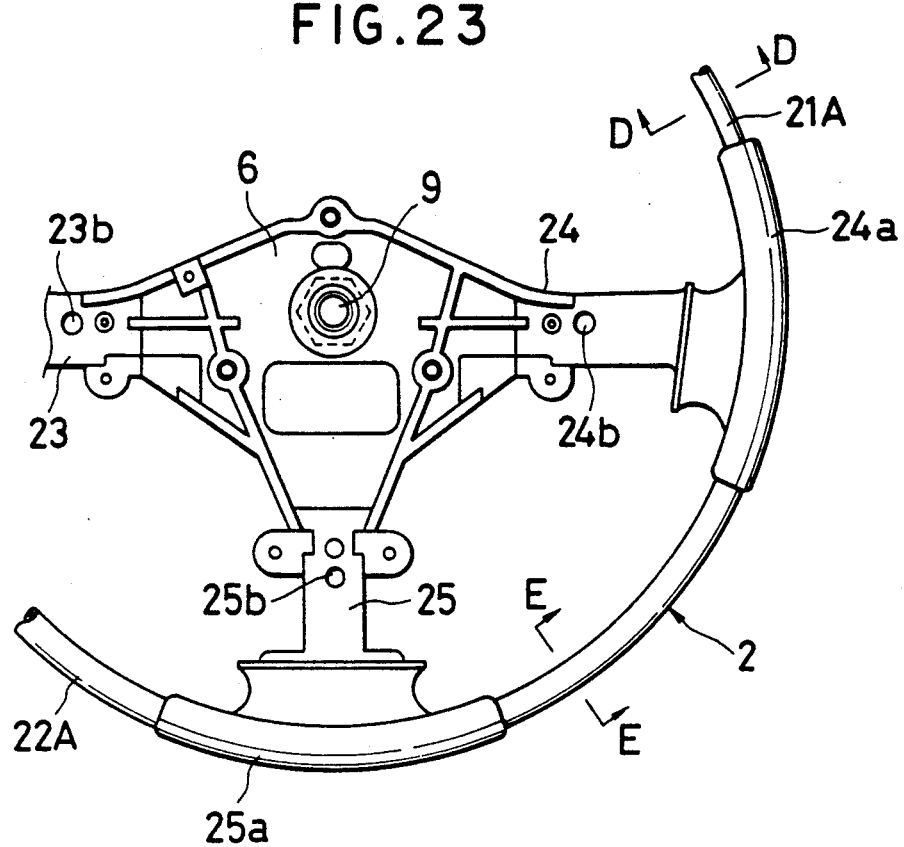
FIG.23
FIG.24　FIG.25　FIG.26
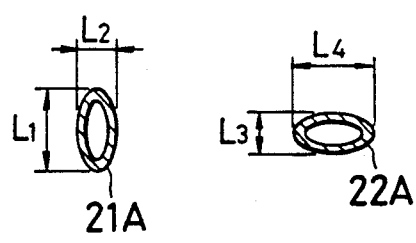
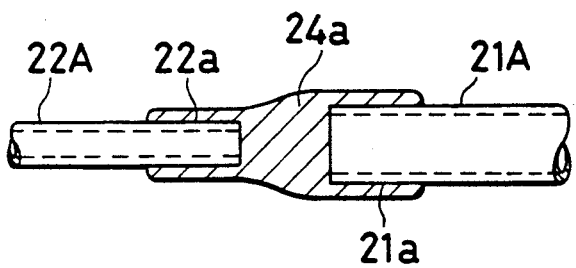

STEERING WHEEL STRUCTURE FOR VEHICLE

BACKGROUND OF THE INVENTION

1. Field of the Invention

The present invention relates to a steering wheel and, more specifically, to a structure for mounting an air bag module on a steering wheel with a spoke extending downward from a steering shaft therein.

2. Description of the Related Art

An air bag module usually includes main components therein such as a folded air bag, and inflator for generating a gas and an igniter which form a single unit. It has been well-known that such air bag module is mounted on a steering wheel structure.

The steering wheel structure is mounted on a steering shaft having an inclination with an acute angle to the vertically standing driver's body. When the vehicle is subjected to an impact rearward at the front thereof, the air bag is inflated to contact the driver's body moving forward relative to the steering wheel structure. In this case, the driver's body tends to turn forward. This forward movement of the driver in addition to the inclination of the steering wheel structure causes the steering wheel to deflect forward at its upper half portion and rearward at its lower half portion.

This deflection of the lower half portion of the steering wheel reduces the distance between the steering wheel and the driver so that a shock absorption effect of the air bag module will be deteriorated for the driver's body portion, specifically the abdomen and breast.

In this respect, Japanese Patent Public Disclosure (JP A) No. 62-234762, laid open to the public in 1987, discloses a steering wheel structure providing the upper half portion with a greater stiffness than the lower half portion thereof so that the lower half portion is readily deflected, absorbing an impact energy, when subjected to a forward force by the driver. Japanese Utility Model Public Disclosure (JP U) No. 2-66368, laid open to the public on May 18, 1990, discloses a similar structure of the steering wheel with an air bag module.

It should be noted, however that it is difficult to deflect the steering wheel properly when the structure is subjected to a forward force.

Meanwhile, in order to provide a broader space in the upper portion of the steering wheel for improving the operability and visuality for the instrument panel, it has been proposed that the steering wheel structure have a spoke extending downward from the steering shaft for carrying a steering wheel ring. For this purpose, when three spokes are provided for carrying the steering wheel ring instead of four spokes, two of the spokes extend obliquely downward in a symmetrical relationship with each other and the rest of one spoke extends straight downward. Since these spokes contribute to increase the rigidity, the lower half portion of the steering wheel structure is greater than the upper half portion in stiffness.

Accordingly, it is difficult to form a steering wheel structure which can be displaced forward desirably so as to absorb the impact energy when the driver hits the inflated air bag forward resulting from an impact at the vehicle front.

SUMMARY OF THE INVENTION

It is, therefore, an object of the present invention to provide a steering wheel structure with an air bag module which provides a desirable energy absorption property.

It is another object of the present invention to provide a steering wheel of which a lower portion can be desirably displaced forward when subjected to a forward force from the driver.

It is still a further object of the present invention to provide a steering wheel structure which allows a forward displacement of a lower portion thereof safely when the structure is subjected to a forward force from the driver.

The above and other objects of the present invention can be accomplished by a steering wheel structure comprising a steering wheel ring, a spoke extending downward from a steering shaft and carrying the steering wheel ring on the steering shaft, an air bag case disposed on a tip end portion of the steering shaft, an air bag received in the air bag case in a folded state, an inflator for inflating the air bag with gas, an igniter for igniting a material in the inflator to produce the gas, and displacing means for allowing the spoke and lower portion of the steering wheel ring to be displaced when subjected to a forward force beyond a predetermined value.

In a preferred embodiment, the steering wheel structure further comprises a second and third spokes extending substantially in left and right directions at the neutral position. In a preferred embodiment, the first spoke is formed with a joint portion for joining the air bag case and with a flexible portion outwardly of the joint portion. The first, second and third spokes are connected with the air bag case. Connecting strength between the first spoke and the air bag is lower than those between the second and third spokes and the air bag.

A lower portion of the first spoke is disengaged from the air bag case when a forward force beyond a predetermined value acts on the lower portion of the steering wheel structure.

In one embodiment, the first spoke is connected with a lower end portion of the air bag case through a frictional engagement which is released when a forward force beyond a predetermined value acts on the lower portion of the steering wheel structure.

An engagement force of the frictional engagement can be controlled by a bolt which extends perpendicular to a direction in which the first spoke is displaced when the lower portion of the steering wheel structure is subjected to a forward force.

Alternatively, the first spoke is connected with a lower portion of the air bag case through a connecting pin which is ruptured to disengage the first spoke from the air bag case when a lower portion of the steering wheel structure is subjected to a forward force beyond a predetermined value.

Further, the first spoke can be connected with a lower portion of the air bag case through a plastic bolt which allows the first spoke to be displaced forward.

In another embodiment, the first spoke may be connected with a lower portion of the air bag case through a plastic grommet which allows the first spoke to be disengaged from a lower portion of the air bag case.

In another structure, the first spoke may be connected with a lower portion of the air bag case through a flexible bellows of most compressed condition which allows the first spoke to be displaced forward away from the air bag module.

In another embodiment, the steering wheel ring is provided with a lower half portion of a relatively low stiffness and an upper half portion of a relatively high stiffness so that the lower half portion of the steering wheel ring is readily displaced forward in response to a forward force beyond a predetermined value.

In another embodiment, the lower half portion of the steering wheel ring is of an elongated circular configuration in section in an up and down direction and the upper half portion is of an elongated circular configuration in section in a fore and aft direction.

Alternatively, the lower half portion of the steering wheel ring is smaller than the upper half portion in diameter.

Further, the lower half portion of the steering wheel ring can be formed with a constricted portion constricted in an up and down direction to enhance the flexibility.

In a further development, the steering wheel structure further comprises a connecting member for connecting the first spoke with one of the second and third spokes. The connecting member is formed with a flexible portion which allows a lower portion of the steering wheel structure to be displaced forward. The connecting member may be provided with a releasing mechanism which releases the connecting member from the first spoke to allow a lower portion of the steering wheel structure to be displaced forward.

In a further embodiment, the displacing means may be formed on the first spoke which is provided with a weakened portion in stiffness which is deflected to allow a lower portion of the steering wheel structure to be displaced forward. In this structure, a cover member is provided on the first spoke over the weakened portion.

The cover member may be formed commonly with a lower bracket of the air bag case through which the air bag case is joined with the first spoke. Alternatively, the lower bracket may be extended downward to constitute the cover member.

In another embodiment, the weakened portion is formed on the first spoke inwardly of a connecting point between the bracket with the first spoke.

In operation, when the vehicle is subjected to an impact from the front side, the air bag module is actuated to inflate the air bag. The air bag is inflated toward the driver M.

In this case, the driver M moves forward relative to the steering assembly and pushes the inflated air bag. This movement of the driver M is applied on the steering wheel assembly in the forward direction through the inflated air bag. Since the first spoke is formed with the weakened portion, the spoke is deformed forward allowing the lower portion of the steering wheel assembly to be displaced forward keeping the impact energy of vehicle from transmitting to the driver through the lower portion of the steering assembly when a forward force of the driver M is greater than a predetermined value. As a result, this steering wheel structure can improve a shock absorption property for the driver, specifically the driver's breast and the abdomen.

The above and the other features will be apparent from the following description made taking reference to the accompanying drawings.

BRIEF DESCRIPTION OF DRAWINGS

FIG. 23 is a plan view of a steering wheel structure in accordance with a still further embodiment of the present invention;

FIG. 24 is a sectional view taken along a line D—D in FIG. 23;

FIG. 25 is a sectional view taken by a line E—E in FIG. 23;

FIG. 26 is a sectional view showing a joint portion of upper and lower members of the steering ring;

DESCRIPTION OF THE PREFERRED EMBODIMENTS

Hereinafter, there will be described a preferred embodiment.

Figure 1:
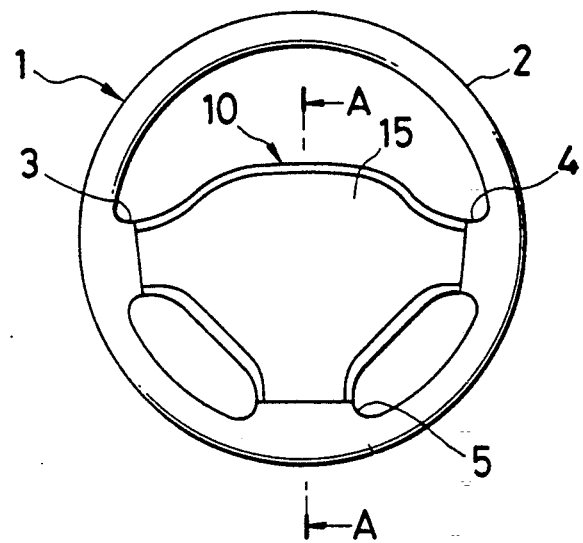
FIG. 1 is a plan view of a steering wheel assembly to which the present invention can be applied.

Referring specifically to FIG. 1, there is shown an external view of a steering wheel assembly 1 in accordance with the present invention. The illustrated steering wheel assembly 1 is provided with a steering wheel ring 2 which is carried by three spokes 3, 4 and 5. The left and right spokes 3 and 4 extend leftward and rightward at a neutral position of the steering wheel ring 2. The central spoke 5 extends downward at the neutral position.

Figure 2:
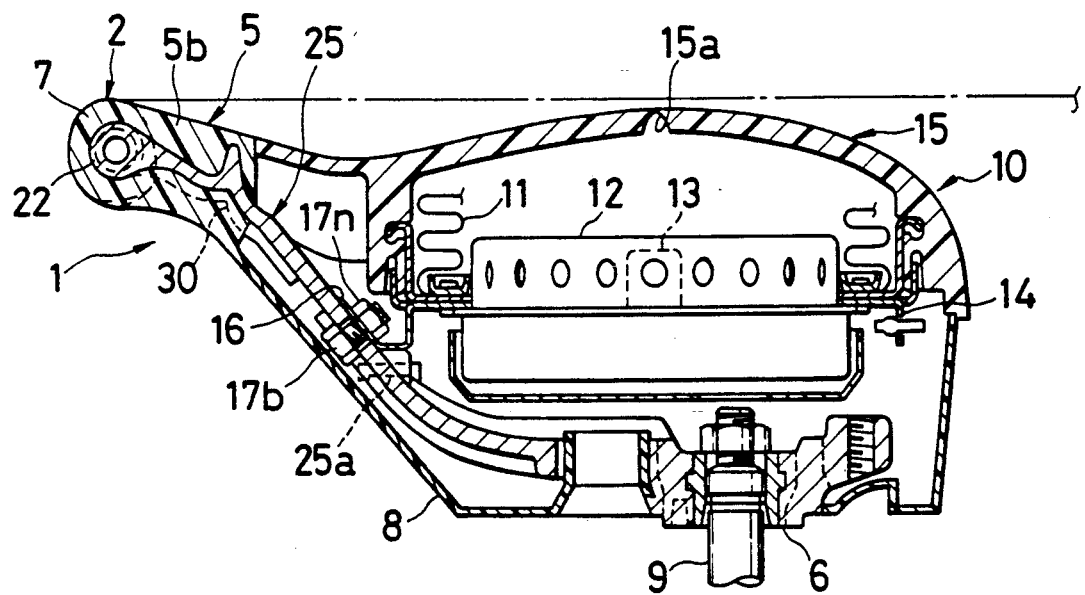
FIG. 2 is a sectional view taken along a line A—A in FIG. 1.

As clearly shown in FIG. 2, an air bag module 10 is disposed in the central portion of the steering wheel assembly 1. The air bag module 10 is provided with an air bag 11 and an air bag case 15 which receives and covers the air bag 11. The air bag module 10 is further provided with an inflator or gas generator 12 for generating and introducing gas into the air bag 11, and an igniter 13 for igniting a gas generation material in the inflator 12 to generate the gas. These elements are mounted on a base plate 14 to form the air bag module 10. Operation of the air bag module is conventionally well-known so that a detailed explanation thereto is omitted.

The steering wheel assembly 1 is provided with the wheel ring 2 of an annular configuration, and a wheel hub 6 which is fixed on the top end portion of a steering shaft 9 which extends beyond through a lower cover 8 which covers a lower side of the hub 6.

Figure 3:
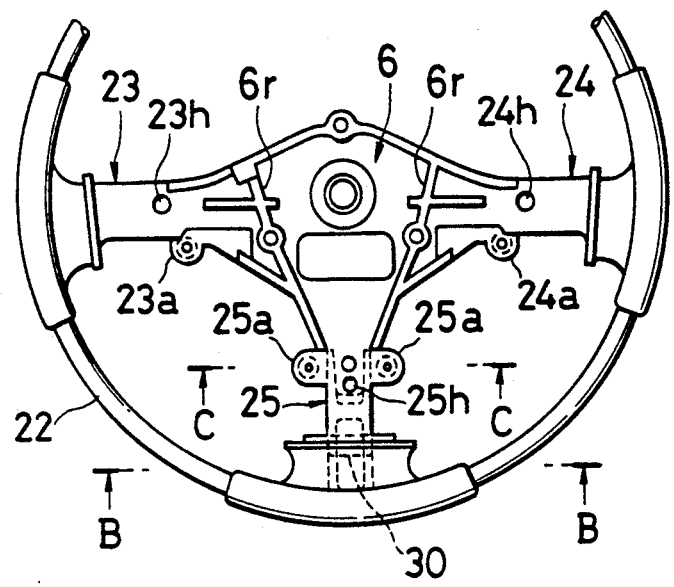
FIG. 3 is a plan view of skeleton of a the steering wheel structure.
Figure 4:
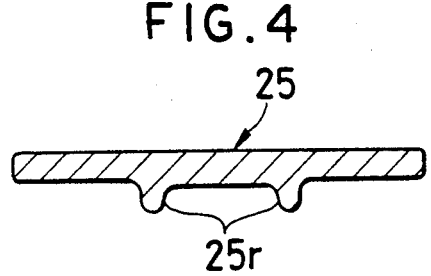
FIG. 4 is a sectional view taken along a line B—B in FIG. 3.
Figure 5:
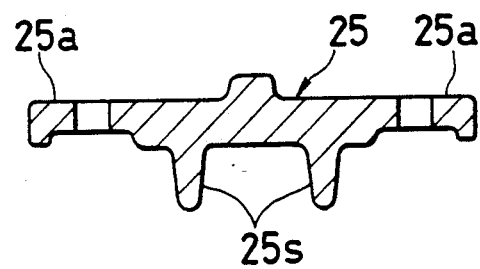
FIG. 5 is a sectional view taken along a line C—C in FIG. 3.
Figure 6:
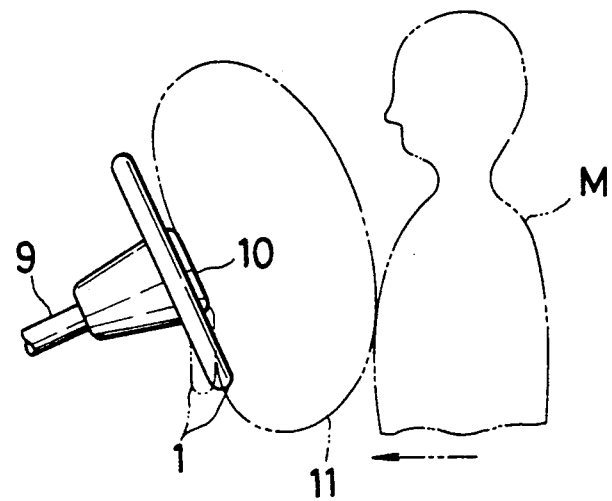
FIG. 6 is a schematic side view showing operation of the air bag system.

As shown in FIG. 3, the illustrated hub 6 is formed with spoke cores 23, 24 and 25 made of a hard material such as metal corresponding to the spokes 3, 4 and 5 respectively. The spoke cores 23, 24 and 25 are connected with a core 22 of the wheel ring 2. The hub 6, cores 23, 24 and 25 of the spokes 3, 4 and 5, and the core 22 of the steering ring 2 are formed integrally by utilizing, for example, an aluminum die cast. The hub 6 is formed with a plurality of reinforcement ribs 6r on the upper surface. The spoke core 25 is also formed with reinforcement ribs 25r, 25s on the back sides and the cores 23 and 24 as well. The spoke cores 23, 24 and 25 are covered by spoke covers 3b, 4b and 5b which is are integrally formed with a wheel ring cover 7 made of a synthetic resin. The central spoke core 25 is formed with a pair of holes 25h through which the air bag module 10 is mounted thereon. Thus, the air bag module 10 is mounted on the spoke core 25 at the lower portion through a bracket 16 joined with the base plate 14 by means of a bolt 17b and nut 17n. The cores 23 and 24 are formed with holes 23h and 24h for mounting the air bag module 10.

The left and right spoke cores 23 and 24 are formed with extensions 23a and 24a through which a bracket is fixed thereon for mounting a switch and the like. The central spoke core 25 is formed with a pair of extensions 25a for mounting the bracket for the switch.

The spoke core 25 is formed with a groove 30 on the back lower than the hole 25 for reducing stiffness thereof. The spoke cover 5b is also formed with a groove corresponding to the groove 30 of the spoke core 25.

In operation, when the vehicle is subjected to an impact from the front side, the air bag module 10 is actuated to inflate the air bag 11. Thus, the bag case 15 is ruptured along a groove 15a on the back to be opened so that the air bag 11 is inflated toward the driver M.

In this case, the driver M moves forward relative to the steering assembly 1 and pushes the inflated air bag 11. This movement of the driver M is applied on the steering wheel assembly 1 in the forward direction through the inflated air bag 11. Since the spoke core 25 is formed with the weakened portion 30, the spoke core 25 is deformed forward allowing the lower portion of the steering wheel assembly to be displaced forward keeping the impact energy of vehicle from transmitting to the driver through the lower portion of the steering assembly 1 when a forward force of the driver M is greater than a predetermined value. As a result, this steering wheel structure can improve a shock absorption property for the driver, specifically the driver's breast and the abdomen.

Figure 7:
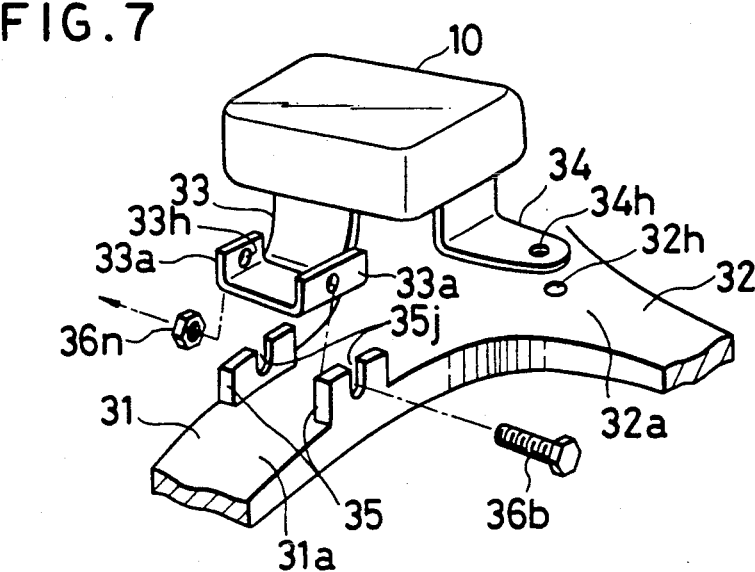
FIG. 7 is an exploded perspective view of the air bag module in accordance another embodiment of the present invention.
Figure 8:
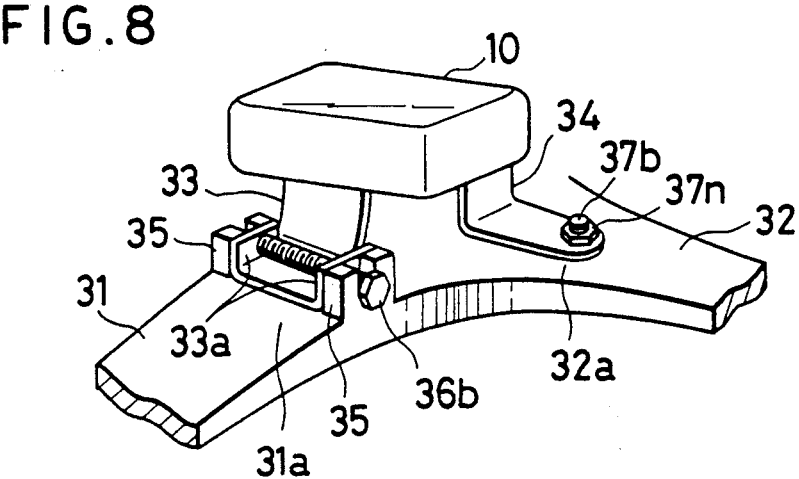
FIG. 8 is a perspective view of the air bag module mounted on the steering wheel structure.

Referring to FIGS. 7 and 8, there is shown another embodiment of the present invention. The same elements as the former embodiment are denoted by the same numerals as the former embodiment and a detailed explanation thereto is omitted. In the illustrated embodiment, the air bag module 10 is provided with a lower retainer 33 and a left and right upper retainers 34 (only the right retainer is shown) on the back for mounting the air bag module 10 on a central spoke core 31 and left and right spoke cores 32 (only the right core is shown). The retainers 33 and 34 are bent to form a L-like configuration and upper ends thereof are firmly fixed to the back of the base plate 14 of the air bag module 10 by means of such as rivet.

The lower flat portion of the retainer 34 is formed with a hole 34h. The central retainer 33 is formed with left and right walls 33a, 33a at a lower portion. The walls 33a, 33a are formed with bolt holes 33h, 33h.

The central spoke core 31 is formed with left and right wall portions 35, 35 projected from the upper surface thereof. The wall portion 35 is formed with a cut out portion 35j on the top. The central retainer 33 is disposed between the wall portions 35, 35. A bolt 36b is inserted into the holes 33h, 33h and fixed by nut 36n after the holes 33h, 33h are in line with the cut out portions 35j, 35j of the wall portions 35, 35 on a mount surface 31a.

The upper retainers 34 are fixed by a bolt 37b and nut 37n after it is firmly contacted with a mount surface 32a of the spoke 32.

Since the air bag module 10 is mounted on the spoke cores 31 and 32, a counterforce resulting from the inflation of the air bag 11 is surely carried by the spokes 31 and 32 through the retainers 33, 34.

As the air bag 11 is inflated, the driver hits the air bag 11 because of the forward movement relative to the steering wheel assembly 1. When the forward force by the driver is greater than a frictional resistance between the retainer 33 and the spoke core 31, the spoke core 31 is deflected resiliently so that they are separated from each other with relative sliding movement. In this case, the retainer 33 has a sufficient stiffness to stay at the original position.

In this case, the upper retainers 34, 34 are firmly fixed to the upper spoke cores 32, 32 by the bolt 37b so that the air bag module 10 is not displaced.

Figure 9:
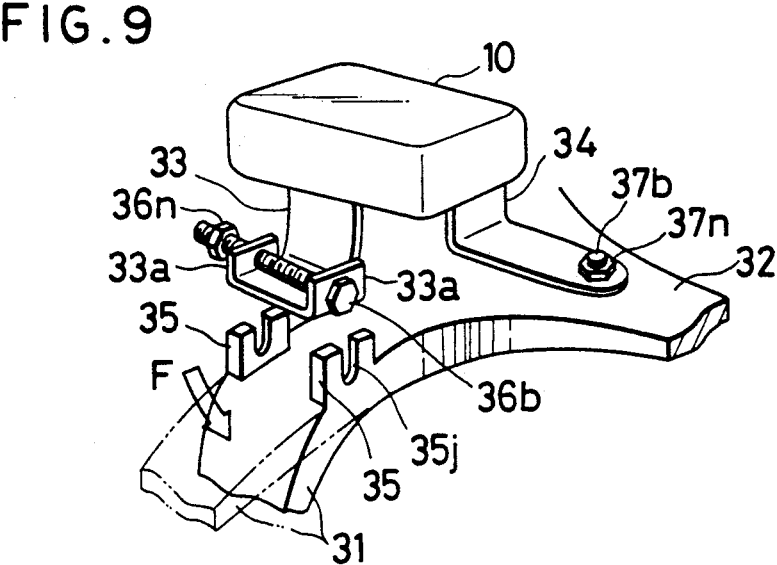
FIG. 9 is a perspective view showing movement of a spoke and the air bag module.

As shown in FIG. 9, the bolt 36b is moved rearward relative to the spoke core 31 so that the spoke core 31 is separated from the retainer 33. This allows the lower portion of the spoke core 31 to be displaced forwardly with staying away from the driver.

A frictional coefficient between the wall portions 33a, 33a of the retainer 33 and the wall portions 35, 35 of the spoke core 31 can be changed by making a coating on a contact portion. If the frictional coefficient is changed, the critical point at which the spoke 31 and the retainer 33 are separated can be controlled.

Hereinafter, there is described a further embodiment of the present invention.

Figure 10:
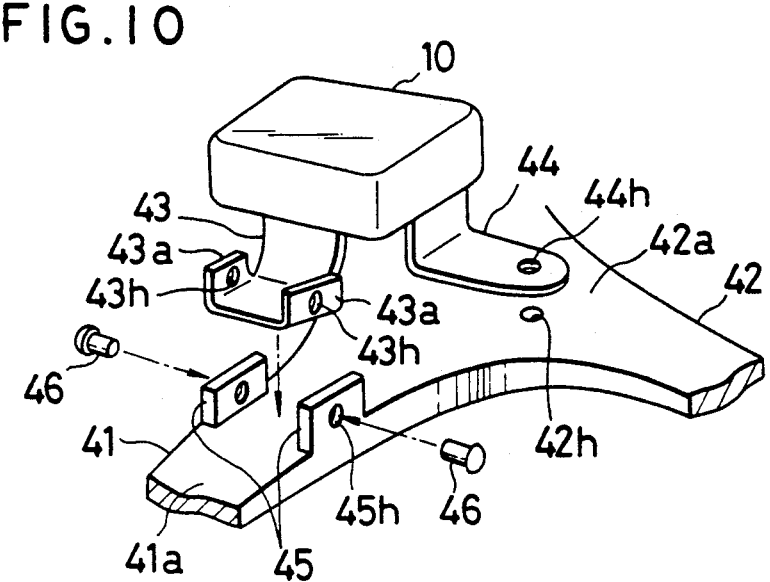
FIG. 10 is an exploded perspective view in accordance with a further embodiment of the present invention.
Figure 11:
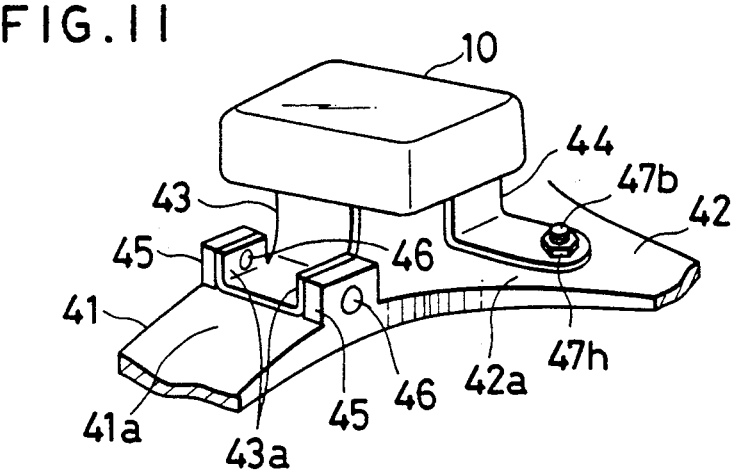
FIG. 11 is a perspective view of the air bag module mounted on the steering wheel structure in the embodiment of FIG. 10.

As shown in FIGS. 10 and 11, left and right wall portions 43a, 43a of a lower retainer 43 are formed with holes 43h, 43h. Left and right wall portions 45, 45 of a central spoke 41 are formed with holes 45h, 45h. Joint pins 46, 46 are inserted into the holes 43h, 43h and 45h, 45h after they are in line with each other so as to join the retainer 43 and the central spoke 41. The joint pins 46, 46 may be made of a resin which is poured into the holes 43h, 45h and hardened therein when the air bag module 10 is mounted on the steering wheel assembly 1.

On the other hand, upper retainers 44, 44 are firmly fixed onto upper spoke cores 42, 42 by bolt 47b and nut 47n through holes 42h, 44h.

Figure 12:
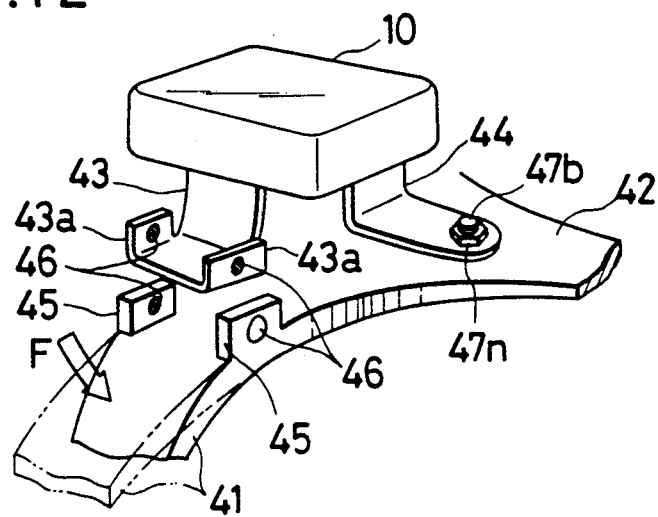
FIG. 12 is a perspective view of the spoke and air bag module disengaged from each other when the lower portion the steering wheel structure is subjected to a forward force F.

In the illustrated embodiment, when the driver M hits the inflated air bag 11 with a force greater than a predetermined value beyond a shearing strength of the joint pins 46, 46, the joint pins 46, 46 are ruptured to allow the central spoke 41 to be resiliently displaced forward as shown in FIG. 12.

In this embodiment, material and/or size of the joint pin 46 is changed so that the critical point can be controlled.

A single joint pin can be employed instead of two joint pins 46, 46 to apply the holes 42h, 44h.

Hereinafter, there is described a yet further embodiment in accordance with the present invention.

Figure 13:
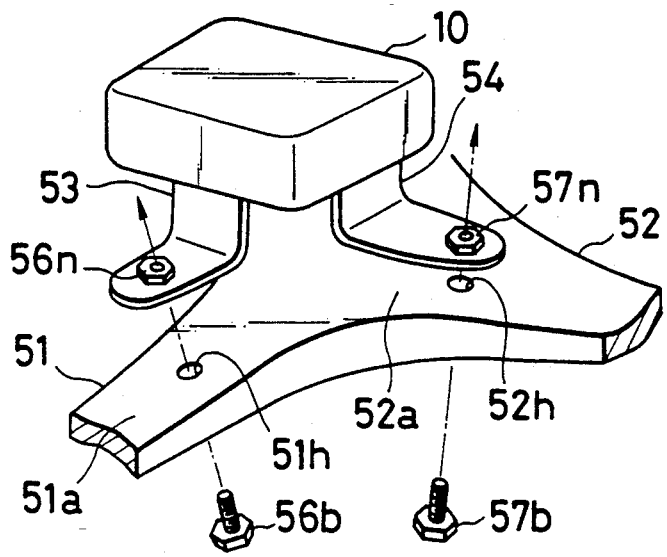
FIG. 13 is an exploded perspective view in accordance with still another embodiment of the present invention.
Figure 14:
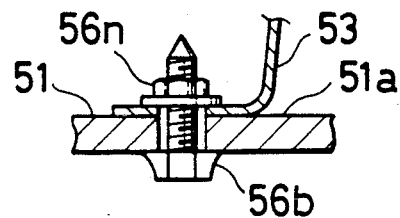
FIG. 14 is a sectional view showing a joint structure the air bag module and spoke in accordance with the embodiment of FIG. 13.
Figure 15:
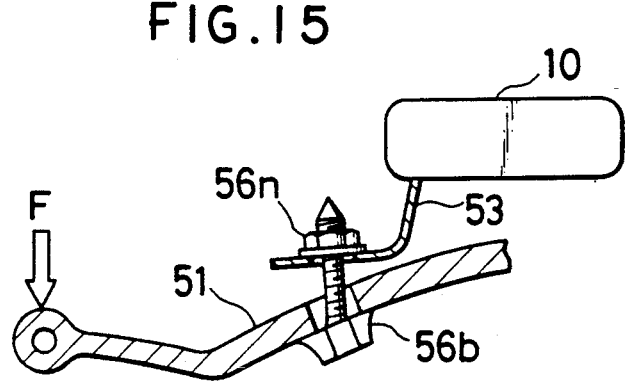
FIG. 15 is a sectional view showing movement of the spoke when the lower portion of the steering wheel structure is subjected to a forward force F.

As shown in FIG. 13, lower retainer 53 is of the same configuration as upper retainers 54, 54. The lower retainer 53 is provided with welded nut 56n thereon. The central spoke core 51 is formed with a hole 51h as well as upper spoke core 52. The retainer 53 is engaged with mount surface 51a of the central spoke 51 at the lower flat portion and secured by plastic bolt 56b and nut 56n. The upper retainers 54, 54 are engaged with mount surfaces 52a, 52a of the upper spoke cores 52, 52 and secured by steel bolt 57b and nut 57n.

In operation, when the driver M hits the inflated air bag 11 and an impact force F from the driver M greater than a predetermined value acts on the lower portion of the steering wheel assembly 1 through the air bag 11, the plastic bolt 56b is forced to be deformed and expanded so as to allow a forward displacement of the central spoke core 51. This means that the lower portion of the steering wheel assembly is displaced forward in response to the forward movement of the driver M resulting from an impact occurred in the front of the vehicle with the lower portion of the steering wheel being kept away from the driver M.

In this embodiment, the plastic bolt 56b may be released from the welded nut 56n or broken to allow the spoke core 51 to be separated from the retainer 53 and displaced forward.

Hereinafter, there is described still another embodiment of the present invention.

Figure 16:
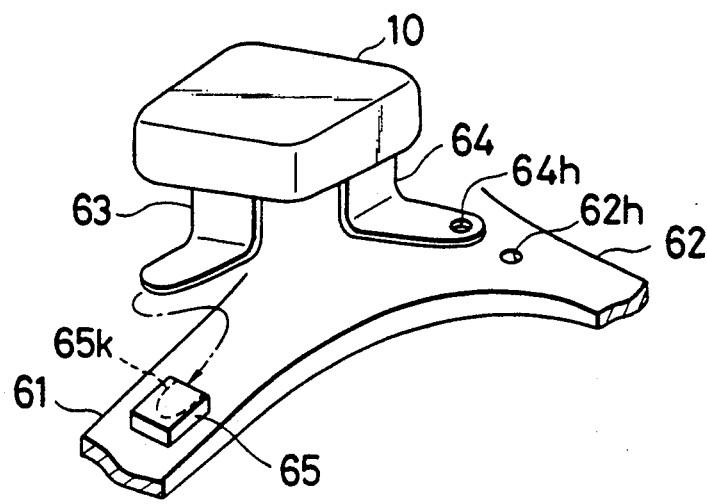
FIG. 16 is an exploded perspective view of an air bag system mounted on the steering wheel structure.
Figure 17:
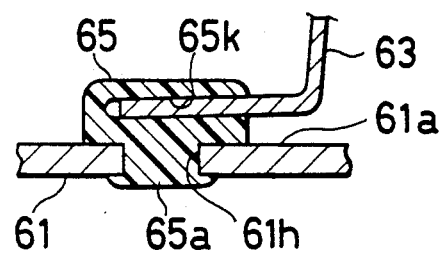
FIG. 17 is a sectional view of a joint structure between the air bag module and spoke.

As shown in FIG. 16, lower retainer 63 is of a configuration similar to upper retainer 64. In the illustrated embodiment, the lower retainer 63 is formed with a pointed portion at the tip end. On central spoke core 61 is mounted plastic grommet 65 by which the lower portion of the retainer 63 is fixed to the spoke core 61.

The grommet 65 is formed with an engaging groove 65k into which the lower portion of the retainer 63 is inserted. The spoke core 61 is formed with a hole 61h through which a base potion 65a of the grommet 65 is engaged with the spoke core 61. The grommet 65 is fixed to the tip end of the lower retainer 63 and engaged with the hole 61h of the spoke core 61 through the base portion 65a so that the retainer 63 is fixed to the spoke core 61.

The grommet may be formed to be fixed to the spoke core 61 and the retainer 63 through a molding.

On the other hand, upper retainer 64 is firmly fixed to spoke core 62 by bolt and nut (not shown) through holes 64h, 62h.

Figure 18:
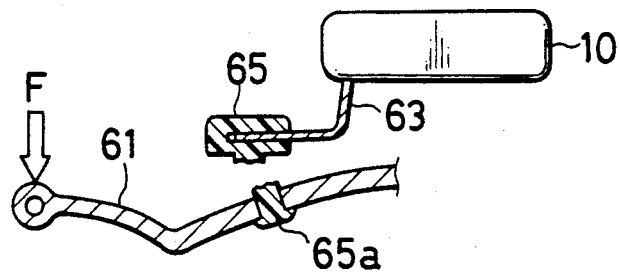
FIG. 18 is a sectional view showing a disengagement from the air bag module and the spoke when the lower portion of the steering wheel structure is subjected to a forward force F and FIG. 19 is a sectional view showing disengagement of another joint structure.

In this embodiment, when the driver M is moved forward and hits the inflated air bag 11 so as to apply a forward force onto the steering wheel assembly 1, the grommet 65 is ruptured as shown in FIG. 18 to allow the spoke core 61 to be displaced forward and stay away from the driver M.

Figure 19:
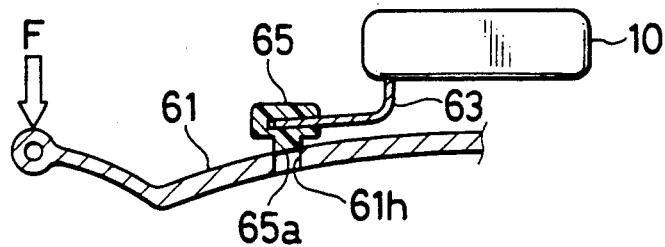

In this structure, it is possible to design so that the grommet 65 is expanded t allow the lower portion of the spoke core 61 to make a forward displacement large enough to absorb an impact energy. Alternatively, it is possible to constitute the grommet 65 in a manner of being disengaged from the spoke core 61 as shown in FIG. 19 wherein the base portion 65a is disengaged from the hole 61h of the spoke core 61.

Hereinafter, there is described still another embodiment according to the present invention.

Figure 20:
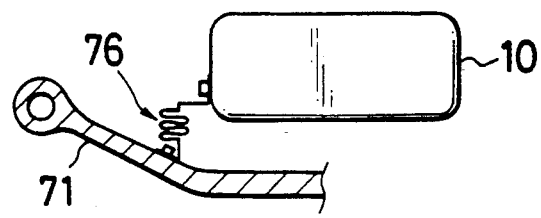
FIG. 20 is a sectional view of another embodiment of joint structure between the spoke and the air bag structure.

As shown in FIG. 20, the lower portion of the air bag module 10 is connected with central spoke core 71 through a connecting member of a resilient bellows 76. An upper portion of the air bag module 10 is firmly fixed to an upper spoke core (not shown) by a steel bolt and nut in the same manner as the former embodiments.

The connecting member 76 is disposed between the air bag module 10 and the spoke core 71 in a most compressed condition. This provides a firm support for the air bag module 10 as the air bag 11 is inflated.

Figure 21:
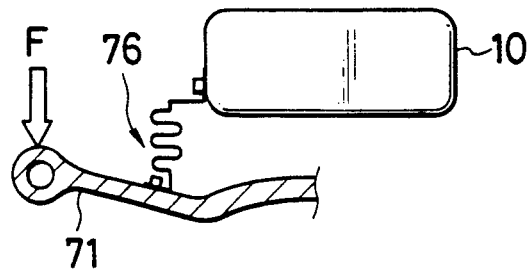
FIG. 21 is a sectional view showing a displaced condition of the spoke when the lower portion of the steering wheel structure is subjected to a forward force F.

When the driver M moves forward and hits the inflated air bag 11 with an impact force greater than a predetermined value, the connecting member 76 is expanded and produces a plastic deformation as shown in FIG. 21 so that the spoke core 71 is virtually disengaged from the air bag module 10. This allows the lower portion of the steering wheel to be displaced forward in accordance with the impact force by the driver M.

Alternatively, the connecting member 76 may be ruptured when subjected to the impact force from the driver M. In this case, the upper spokes are firmly fixed to the upper portion of the air bag module 10 not to be displaced.

Hereinafter, there is described a yet further embodiment of the present invention.

Figure 22:
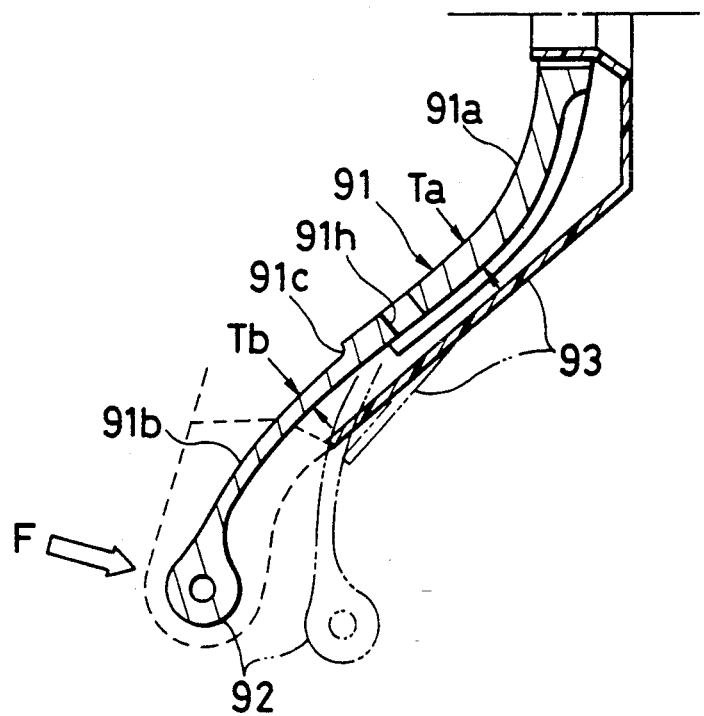
FIG. 22 is a sectional view showing another embodiment of the present invention.

As shown in FIG. 22, central spoke 91 changes its thickness. The central spoke 91 is formed with a changing portion 91c in thickness outside of hole 91h. Thickness Tb of lower portion or outer portion 91b of the central spoke 91 is smaller than thickness Ta of upper portion or inner portion 91a thereof. That is, the lower portion 91b is more flexible or less rigid than the upper portion 91a.

With this structure, when a forward impact force is greater than a predetermined value in the case where the driver M is moved forward and hits the inflated air bag 11, the lower portion 91b of the spoke core 91 is easily deflected and displaced forward.

As shown in FIG. 22, there is provided a lower cover 93 which covers the back side of the spoke 91. The lower portion 91b of reduced thickness is formed beyond the outer end of the lower cover 93. The lower cover 93 is flexible enough to be deformed when pushed by the spoke core 91 so that the forward displacement of the lower portion 91b is not affected.

Hereinafter, there is described a further embodiment of the present invention.

Referring to FIG. 23, the illustrated steering wheel ring core 22 is divided into upper member 21A and lower member 22A of half rings respectively. The spokes 23,24 and 25 include apertures 23b,24b and 25b, respectively, for mounting the air bag module. The upper member 21A is of an elongated configuration in an up and down direction (L1>L2) as shown in FIG. 24. On the other hand, the lower member 22A is of an elongated configuration in a left and right direction (L4>L3) as shown in FIG. 25.

The upper member 21A is connected with the lower member 22A at the end portions 21a and 22a through outer portions 23a and 24a as shown in FIG. 26.

With this structure, the section modulus of the upper member 21A is made greater than that of the lower member 22A without changing the weight in a direction along which the impact force acts. Thus, when the driver M moves forward and hits the inflated air bag 11, the lower member 22A of the wheel ring core 22 is easily deflected and displaced forward staying away from the driver M. The wheel ring core 22 absorbs the impact energy as it is deflected.

According to this embodiment, the wheel ring core 22 which is not used to support the air bag module 10 is not needed to be stiff to that effect. This enables the wheel ring core 22 to be flexible enough to absorb the impact energy in response to the forward movement of the driver M.

Although the steering wheel ring 22 in the former embodiment is divided into two pieces, it is not necessarily so divided. The steering wheel ring 22 can be constituted by changing flexibility between the lower half portion and upper half portion thereof so that the lower half portion can be made flexible.

Hereinafter, there is described a further embodiment of the present invention.

Figure 27:
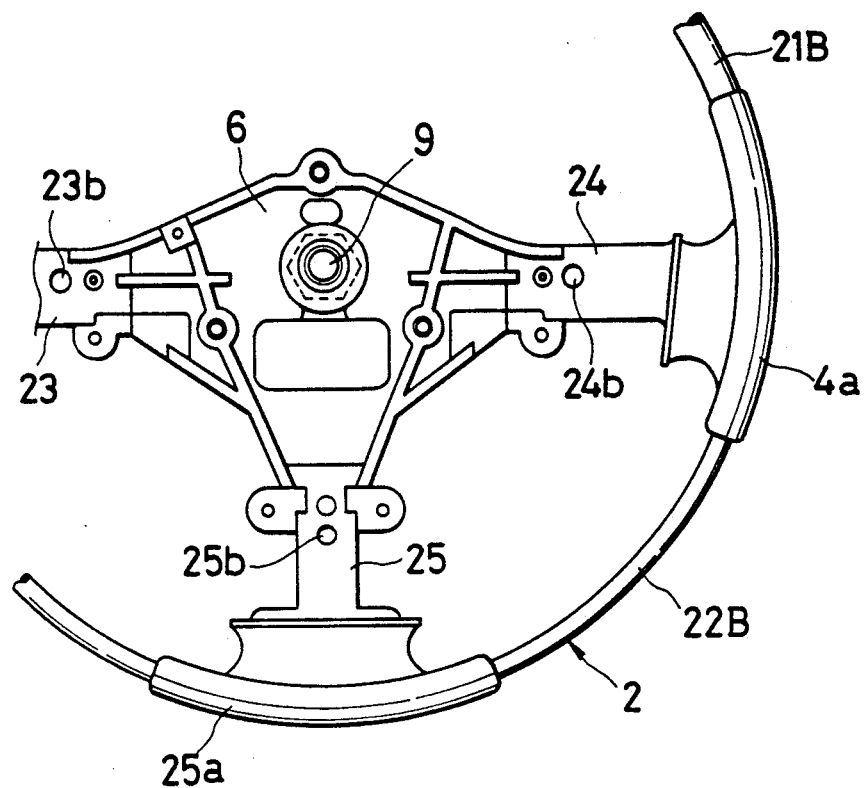
FIG. 27 is a plan view of the steering wheel structure in accordance with a yet further embodiment of the present invention.

In the illustrated embodiment, lower member 22B is smaller than upper member 21B in diameter as shown in FIG. 27 to make the lower half portion of the steering wheel ring core 22 flexible.

Figure 28:
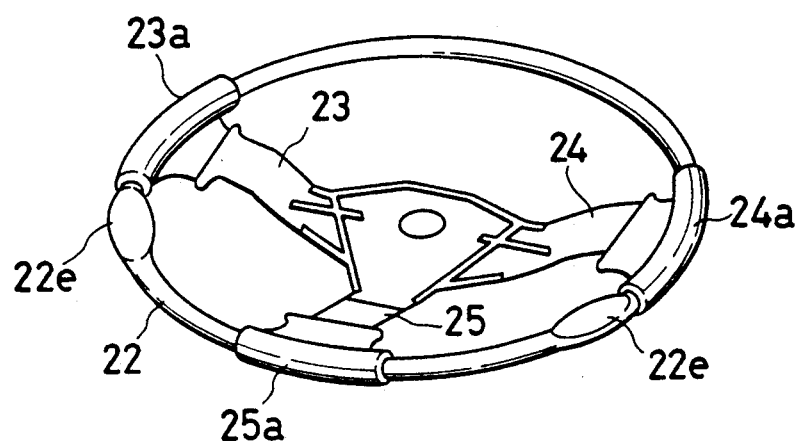
FIG. 28 is a perspective view of a steering wheel structure in another embodiment of the present invention.

In order to reduce stiffness of the lower portion of the steering wheel ring core 22, constricted portions 22e, 22e are formed at positions lower than the outer end portions 23a and 24a of the upper spoke cores 23, 24 as shown in FIG. 28.

Hereinafter, there is described still another embodiment of the present invention.

Figure 29:
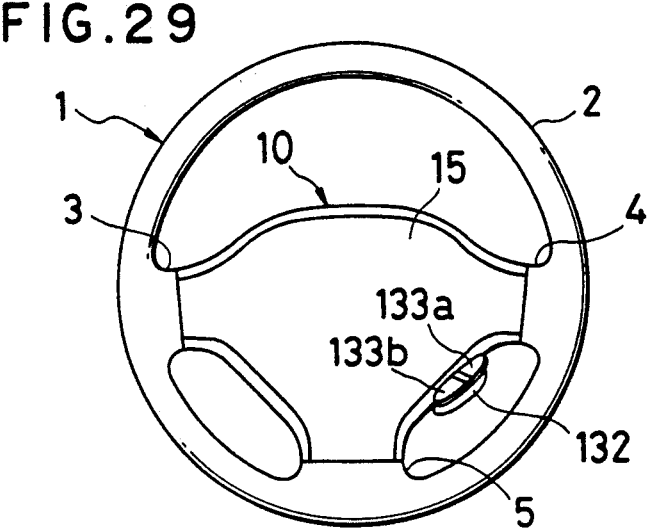
FIG. 29 is a plan view of a steering wheel structure accordance with another embodiment of the present invention.
Figure 30:
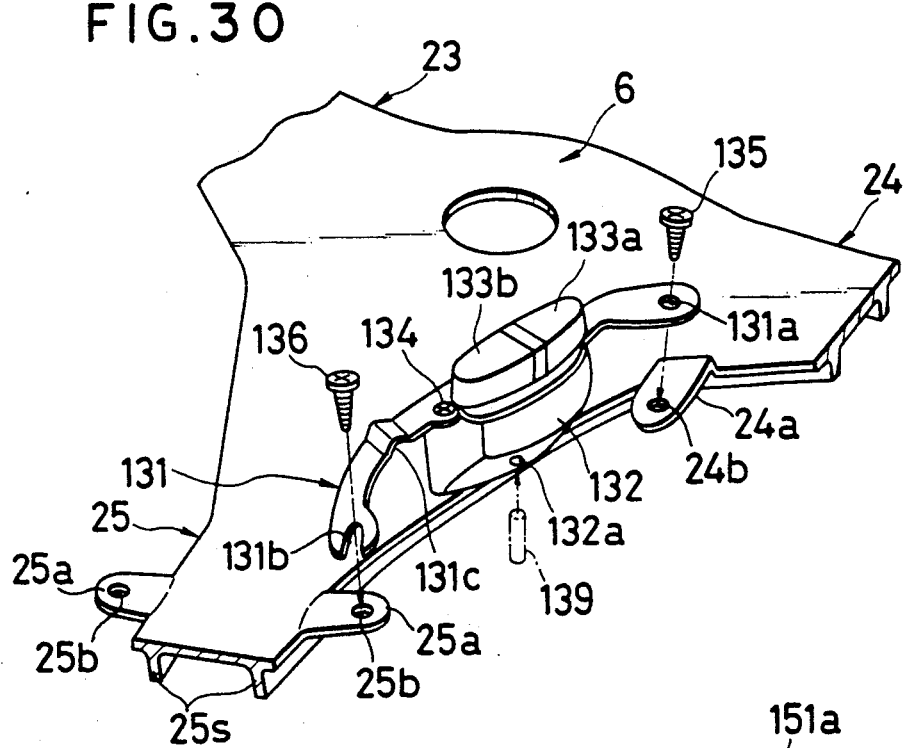
FIG. 30 is a perspective view showing a connecting member between two spokes in accordance with the embodiment of FIG. 29.

Referring to FIG. 29, the illustrated steering wheel assembly 1 is provided with operation switches 133a, 133b in a space defined by the spokes 4 and 5. Referring further to FIG. 30, the switches 133a, 133b are mounted on the steering wheel assembly 1 through a bracket 131. In mounting the switches 133a, 133b, a base portion 132 joined with the switches 133a, 133b is fixed to the bracket 131 through screws 134. The bracket 131 is disposed to connect the spoke core 24 with the spoke core 25. The bracket 131 is connected with the extension 24a of the spoke 24 at an upper end and with the extension 25a of the spoke 25. The base portion 132 is formed with a hole 132a for engaging with a positioning pin 139.

The switches 133a, 133b can be disposed in a space defined by the spoke core 23 and the spoke core 24 and can be mounted thereon through the extensions 23a and 25a. In the illustrated embodiment, the bracket 131 is formed with a round hole 131a at the upper end portion. A screw 135 is inserted into the hole 131a and a hole 24b of the extension 24a so that the upper end of the bracket 131 is joined with the spoke core 24. The bracket 131 is formed with a cut out portion 131b at the lower end. After the cut out portion 131b is aligned with a hole 25b, a screw 36 is applied to the cut portion 131b and the hole 25b so that the lower end of the bracket 131 is joined with the spoke 25. Since the lower end of the bracket 131 is an open end, it is easy to be released from the spoke core 25 when an impact force acts forward thereon. The bracket 131 is formed with a folded portion or a flexible portion 131c lower than a point where the base portion 132 is located. The flexible portion 131c allows the lower portion of the bracket 131 to make a forward movement smoothly when subjected to a forward force.

Since the central spoke core 25 is formed with the groove portion 30, the lower portion of the stoke core 25 can be readily displaced together with the bracket 131 when subjected to a forward force greater than a predetermined value. If the forward force acts on the lower portion of the steering wheel assembly 1 beyond an allowable maximum deflection of the flexible portion 131c of the bracket 131, the lower end of the bracket 131 is released from the spoke core 25 because of the open end. This assures that the lower portion of the steering wheel assembly 1 makes a smooth forward movement in response to the forward force by the driver.

Figure 31:
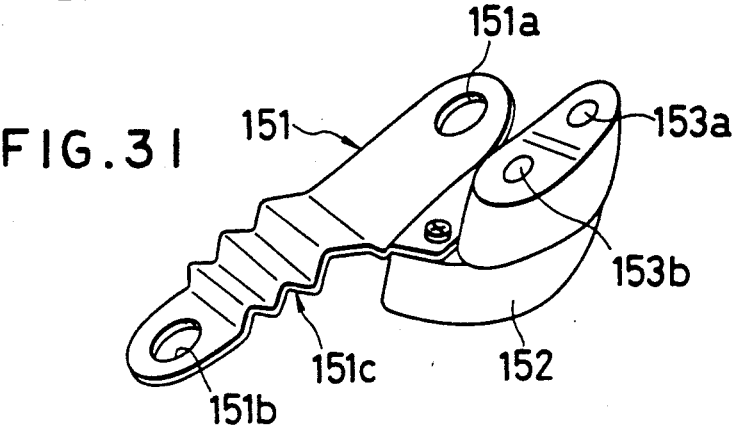
FIG. 31 is a perspective view showing another structure of the connecting member.

Referring to FIG. 31, there is shown another structure of bracket 151 for switches 153a, 153b. The illustrated bracket 151 is formed with round holes 151a and 151b at both ends. A flexible portion 151c is formed with a plurality of folded portions lower than a base portion 152 unlike a single folded portion of the bracket 131 of the former embodiment to enhance the flexibility.

With this structure, when the lower portion of the steering wheel assembly 1 is subjected to a forward force from the driver M, the spoke core 25 is displaced forward by virtue of the groove portion 30 and the bracket 151 is displaced forward following the spoke core 25 without disengaging from the spoke core 25. In both cases, the brackets 131 and 151 ensure that the lower portion of the steering wheel assembly 1 makes a smooth forward displacement when subjected a forward force by the driver beyond a predetermined value.

Figure 32:
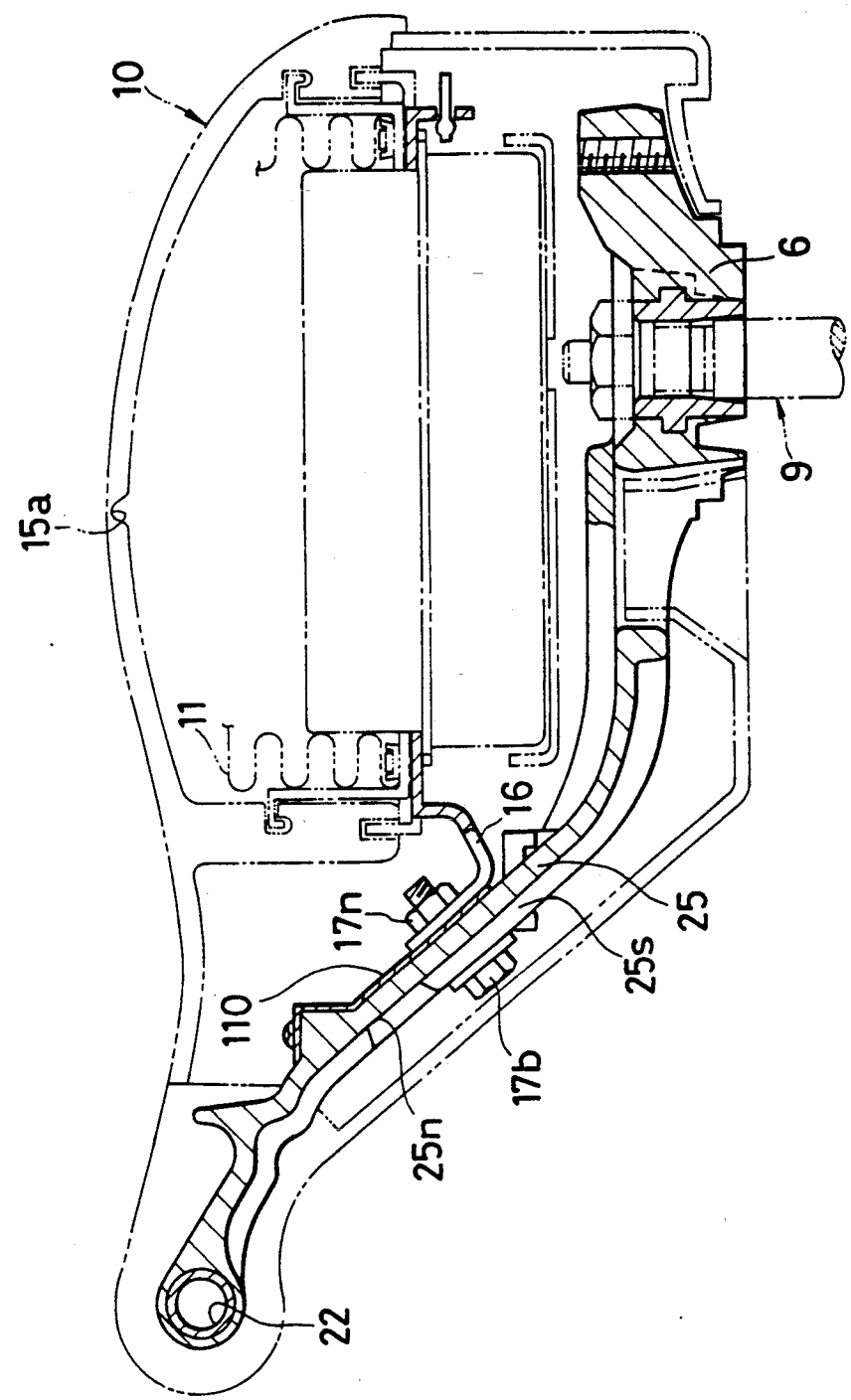
FIG. 32 is a sectional view of a steering wheel structure in accordance with another embodiment of the present invention.
Figure 33:
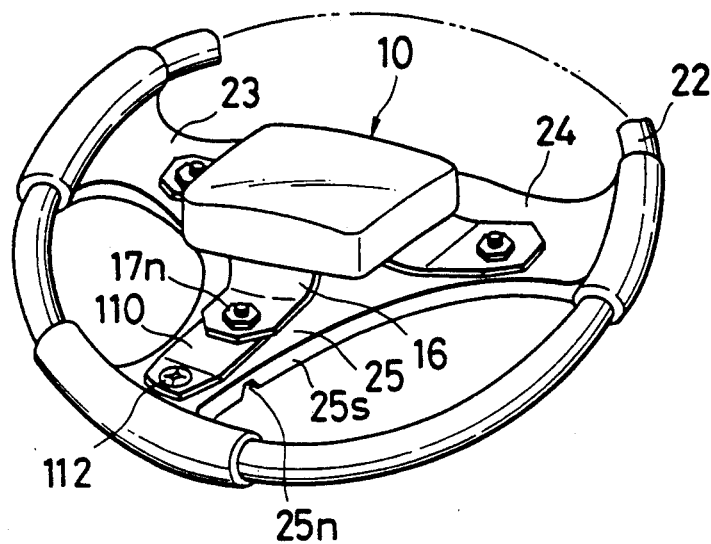
FIG. 33 is a perspective view of the embodiment of FIG. 32.

Referring to FIGS. 32 and 33, the central spoke 25 is formed with a notched portion 25n on the back side by partly removing the reinforcement rib 25s so as to reduce the stiffness thereof. As a result, the when the lower portion of the steering wheel assembly is subjected to a forward force, the spoke core 25 is deflected forward at the notched portion 25n.

A cover member 110 is disposed on an upper surface opposite to the surface where the notched portion 25n is formed. The cover member 110 covers an area corresponding to the notched portion 25n. The cover member 110 is fixed onto the spoke core 25 at an upper end portion by means of the bolt 17b and nut 17n together with the bracket 16 of the air bag module 10 and by means of a screw 112 at a lower end portion.

In operation, when the lower portion of the steering wheel assembly 1 is subjected to a forward force from the driver M, the spoke core 25 is deflected forward at the notched portion so that the lower portion of the steering wheel assembly 1 is displaced forward in response to the forward force. In this case, if the spoke core 25 is ruptured because the forward force exceeds the allowable value, the cover member 110 holds opposite sides of the ruptured spoke core 25 so that they are not separated into pieces. Thus, this structure with the cover member 110 can improve the safety of the air bag system.

Figure 34:
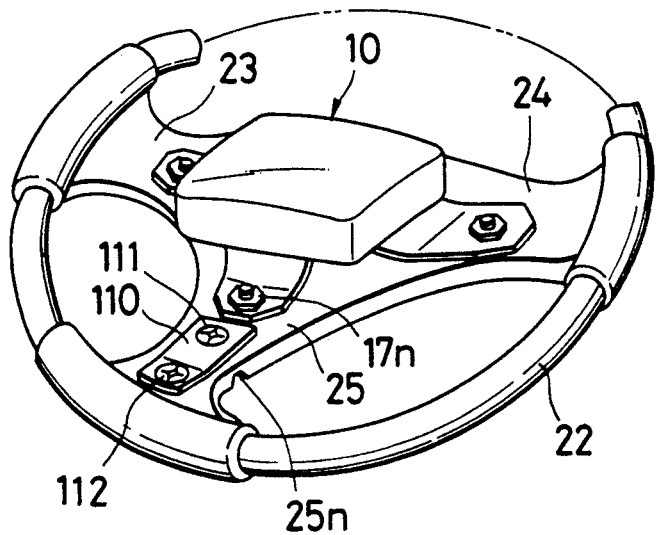
FIG. 34 is a perspective view of the steering wheel structure in accordance with another embodiment of the present invention.

Referring to FIG. 34, there is shown another structure of cover member 110. In this embodiment, the cover member 110 straddles both sides of the notched portion 25n on the opposite surface thereto as well as the former embodiment. The illustrated cover member 110 is fixed to the spoke core 25 by means of screws 111 and 112 independent from the air bag module 10.

Figure 35:
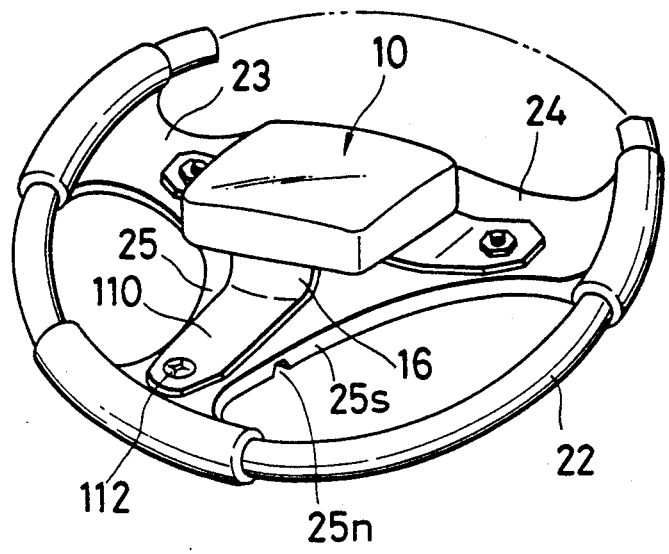
FIG. 35 is a perspective view of the steering wheel structure in accordance with still another embodiment of the present invention.

Referring to FIG. 35, cover member 110 is provided commonly as bracket 16 of the air bag module 10. Namely, the bracket 16 is extended beyond a position of notched portion 25n and fixed to the spoke core 25 at a lower end portion by screw 112. According to the illustrated structure, the number of parts can be reduced and the structure can be easily assembled.

Figure 36:
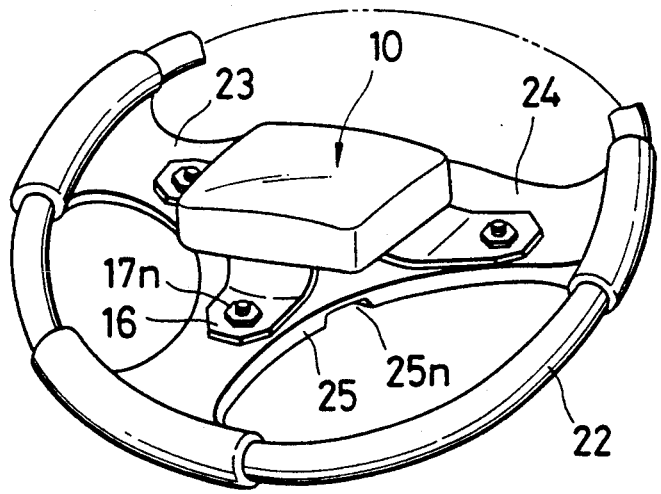
FIG. 36 is a perspective view of the steering wheel structure in accordance with a further embodiment of the present invention.

Alternatively, as shown in FIG. 36, notched portion 25n can be formed as close as possible to the center of the steering wheel ring 2. That is, the notched portion 25n is located above the hole 25h for fixing the air bag module 10 through the bracket 16 by the bolt 17b and nut 17n. This structure eliminates the necessity of the cover member without deteriorating the safety of the air bag system.

Although the present invention has been explained with reference to specific, preferred embodiments, one of ordinary skill in the art will recognize that modifications and improvements can be made while remaining within the scope and spirit of the present invention. The scope of the present invention is determined solely by the appended claims.

What is claimed is:

1. A steering wheel structure comprising:
a steering wheel ring,
a first spoke extending downward from a steering shaft at a neutral position of the steering wheel ring and carrying the steering wheel ring on the steering shaft,
second and third spokes extending substantially in left and right directions when said steering wheel ring is in said neutral position,
an air bag case disposed on a tip end portion of the steering shaft,
joint portions interconnecting said air bag case with said first, second and third spokes,
an air bag received in the air bag case in a folded state,
an inflator for inflating the air bag with gas,
an igniter for igniting a material in the inflator to produce the gas, and
displacing means for allowing the first spoke and a lower portion of the steering wheel ring to be displaced when subjected to a forward force beyond a predetermined value, the displacing means being formed on said first spoke at a position radially outside of the joint portion interconnecting said air bag case with said first spoke.

2. A steering wheel structure comprising:
a steering wheel ring,
a first spoke extending downward from a steering shaft at a neutral position of the steering wheel ring and carrying the steering wheel ring on the steering shaft,
second and third spokes extending substantially in left and right directions when said steering wheel ring is in said neutral position,
an air bag case disposed on a tip end portion of the steering shaft,
an air bag received in the air bag case in a folded state,
an inflator for inflating the air bag with gas,
an igniter for igniting a material in the inflator to produce the gas, and
displacing means for allowing the first spoke and a lower portion of the steering wheel ring to be displaced when subjected to a forward force beyond a predetermined value,
the first, second and third spokes being connected with the air bag case with a connecting strength between the first spoke and the air bag case which is lower than connecting strengths between the second and third spokes and the air bag case.

3. A steering wheel structure as recited in claim 1 wherein a lower portion of the first spoke is disengaged from the air bag case when a forward force beyond a predetermined value acts on a lower portion of the steering wheel structure.

4. A steering wheel structure as recited in claim 1 wherein the first spoke is connected with a lower end portion of the air bag case through a frictional engagement which is released when a forward force beyond a predetermined value acts on a lower portion of the steering wheel structure.

5. A steering wheel structure as recited in claim 4 wherein an engagement force of the frictional engagement is controlled by a bolt which extends perpendicular to a direction in which the first spoke is displaced when a lower portion of the steering wheel structure is subjected to a forward force.

6. A steering wheel structure as recited in claim 1 wherein the first spoke is connected with a lower portion of the air bag case through a connecting pin which is ruptured to disengage the first spoke from the air bag case when a lower portion of the steering wheel structure is subjected to a forward force beyond a predetermined value.

7. A steering wheel structure as recited in claim 1 wherein the first spoke is connected with a lower portion of the air bag case through a plastic bolt which allows the first spoke to be displaced forward when a lower portion of the steering wheel structure is subjected to a forward force beyond a predetermined value.

8. A steering wheel structure as recited in claim 1 wherein the first spoke is connected with a lower portion of the air bag case through a plastic grommet which allows the first spoke to be disengaged from the lower portion of the air bag case when a lower portion of the steering wheel structure is subjected to a forward force beyond a predetermined value.

9. A steering wheel structure as recited in claim 1 wherein the first spoke is connected with a lower portion of the air bag case through a flexible bellows which allows the first spoke to be displaced forward away from the air bag case when the steering wheel structure is subjected to a forward force beyond a predetermined value.

10. A steering wheel structure as recited in claim 1 wherein the steering wheel ring is provided with a lower half portion of a relatively low stiffness and an upper half portion of a relatively high stiffness so that the lower half portion of the steering wheel ring is displaced forward when a lower portion of the steering wheel structure is subjected a forward force beyond a predetermined value.

11. A steering wheel structure as recited in claim 10 wherein the lower half portion of the steering wheel ring is of an elongated circular configuration in section in an up and down direction and the upper half portion of the steering wheel ring is of an elongated circular configuration in section in a fore and aft direction.

12. A steering wheel structure as recited in claim 10 wherein the lower half portion of the steering wheel ring is smaller than the upper half portion in diameter.

13. A steering wheel structure as recited in claim 10 wherein the lower half portion of the steering wheel ring is formed with a constricted portion which is constricted in an up and down direction to enhance the flexibility.

14. A steering wheel structure as recited in claim 1 further comprising a connecting member for connecting the first spoke with one of the second and third spokes, the connecting member being formed with a flexible portion which allows a lower portion of the steering wheel structure to be displaced forward when the lower portion of the steering wheel structure is subjected to a forward force beyond a predetermined value.

15. A steering wheel structure as recited in claim 14 wherein the connecting member is provided with a releasing mechanism which releases the connecting member from the first spoke to allow a lower portion of the steering wheel structure to be displaced forward when the lower portion of the steering wheel structure is subjected to a forward force beyond a predetermined value.

16. A steering wheel structure as recited in claim 1 wherein the displacing means is formed on the first spoke which is provided with a weakened portion which is weakened in stiffness and which is deflected to allow a lower portion of the steering wheel structure to be displaced forward when the lower portion of the steering wheel structure is subjected to a forward force beyond a predetermined value.

17. A steering wheel structure as recited in claim 16 wherein a cover member is provided on the first spoke over the weakened portion.

18. A steering wheel structure as recited in claim 17 wherein the cover member is formed commonly with a lower bracket of the air bag case through which the air bag case is joined with the first spoke.

19. A steering wheel structure as recited in claim 18 wherein the lower bracket is extended downward to constitute the cover member.

20. A steering wheel structure as recited in claim 18 wherein the weakened portion is formed on the first spoke inwardly of a connecting point between the bracket and the first spoke.

* * * * *